United States Patent
Eder et al.

(10) Patent No.: US 6,856,280 B1
(45) Date of Patent: Feb. 15, 2005

(54) METHOD AND RADAR SYSTEM FOR DETERMINING THE DIRECTIONAL ANGLE OF RADAR OBJECTS

(75) Inventors: Sonja Eder, Koengen (DE); Benoit Budiscak, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 10/618,973

(22) Filed: Jul. 14, 2003

(30) Foreign Application Priority Data

Jul. 12, 2002 (DE) ........................................ 102 31 597

(51) Int. Cl.$^7$ ........................... G01S 13/06; G01S 13/93
(52) U.S. Cl. ........................ 342/147; 342/27; 342/118; 342/128; 342/146; 342/175; 342/192; 342/195
(58) Field of Search ............................ 342/27, 28, 70, 342/71, 72, 118, 128–147, 155–158, 165, 173, 174, 175, 192–197

(56) References Cited

U.S. PATENT DOCUMENTS

| | | | | |
|---|---|---|---|---|
| 4,275,399 A | * | 6/1981 | Marom ........................ | 342/192 |
| 4,308,536 A | * | 12/1981 | Sims et al. ................... | 342/70 |
| 5,659,520 A | * | 8/1997 | Watson et al. ............... | 342/146 |
| 5,923,280 A | * | 7/1999 | Farmer ........................ | 342/70 |
| 5,949,366 A | * | 9/1999 | Herrmann .................... | 342/72 |
| 5,982,321 A | * | 11/1999 | Iihoshi et al. ............... | 342/146 |
| 6,028,548 A | * | 2/2000 | Farmer ........................ | 342/70 |
| 6,246,357 B1 | * | 6/2001 | Uehara ........................ | 342/70 |
| 6,469,656 B1 | * | 10/2002 | Wagner et al. ................ | 342/70 |
| 6,518,916 B1 | * | 2/2003 | Ashihara et al. .............. | 342/70 |
| 6,657,582 B2 | * | 12/2003 | Seki et al. .................... | 342/70 |

FOREIGN PATENT DOCUMENTS

DE      195 43 813 A1      5/1997

OTHER PUBLICATIONS

R.J. Matheson, "Strategies For Spectrum Usage Measurements", IEEE 1988 International Symposium On Electromagnetic Compatibility, Seattle, WA, Aug. 2–4, 1988, pp. 235–241.

* cited by examiner

Primary Examiner—Bernarr E. Gregory
(74) Attorney, Agent, or Firm—Kenyon & Kenyon

(57) ABSTRACT

A method for determining the directional angle of radar objects using a multibeam radar, including the steps of:
(a) recording the frequency spectra of the radar echoes for a plurality of beams;
(b) seeking a measuring frequency near a frequency maximum assigned to the radar object; and
(c) comparing the phases and/or amplitudes of the radar echoes at the measuring frequency with reference patterns known for various directional angles, steps (b) and (c) being executed repeatedly, each time for different measuring frequencies, and the directional angles obtained for the various measuring frequencies being checked for consistency.

5 Claims, 4 Drawing Sheets

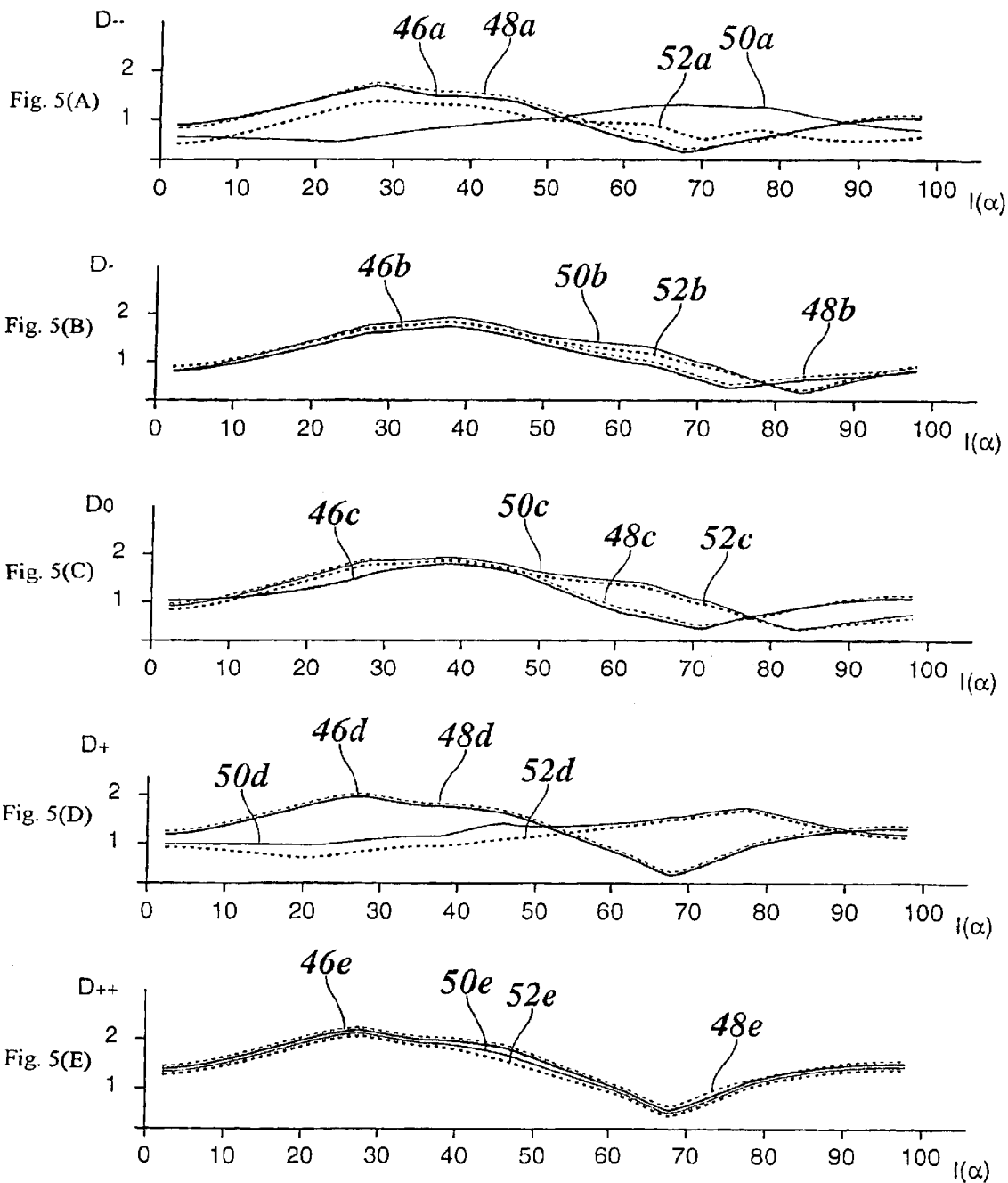

METHOD AND RADAR SYSTEM FOR DETERMINING THE DIRECTIONAL ANGLE OF RADAR OBJECTS

FIELD OF THE INVENTION

The present invention is directed to a method for determining the directional angle of radar objects using a multibeam radar, including the steps of:
(a) recording the frequency spectra of the radar echoes for a plurality of beams;
(b) seeking a measuring frequency near a frequency maximum assigned to the radar object; and
(c) comparing the phases and/or amplitudes of the radar echoes at the measuring frequency with reference patterns known for various directional angles.

BACKGROUND INFORMATION

A method is known from German Patent Application No. 195 43 813. It is used in a motor vehicle to determine the positions of radar objects, for example of vehicles driving ahead, using a static multibeam radar, so that then, within the framework of an adaptive cruise control (ACC), the velocity of one's own vehicle is adapted to the velocity of a vehicle driving ahead, and the distance to the vehicle driving ahead can be regulated to a suitable value. The positions of the radar objects are indicated in polar coordinates, thus by distances and directional angles. The distances can be determined on the basis of the signal propagation times of the radar echoes. In addition, using the Doppler effect, the relative velocities of the radar objects can be determined. However, for an error-free distance control (vehicle-to-vehicle ranging), the directional (course) angles of the radar objects are needed in order for a decision to be made as to whether a located (tracked) radar object is a vehicle driving ahead in one's own lane, or a vehicle driving in an adjacent lane that is irrelevant for the distance control.

In the context of a static multibeam radar, the optical axis of the radar system is fixed in relation to the vehicle. It is preferably parallel to the longitudinal axis of the vehicle. This optical axis then expediently forms the reference axis for determining the directional angles. The multibeam radar system has a plurality of receiving elements, each of whose sensitivity maxima are in different receiving directions, so that altogether, therefore, they cover a specific angular range. Since the sensitivy ranges of the receiving elements overlap one another, from one single radar object, one receives radar echoes in a plurality of channels, i.e., in a plurality of receiving elements. For an idealized, nearly punctiform radar object, at a given directional angle, a characteristic phase and amplitude relation exists among the signals received in the various channels. Due to the differences in the propagation time (delay differences) of the radar echoes from the radar object to the various receiving elements, a phase difference is derived which is proportional to the directional angle and to the distance of the receiving elements in the right-angled direction to the optical axis, and is inversely proportional to the wavelength of the radar waves. The amplitude ratios among the received signals are dependent upon the directional angle and upon the sensitivity curves of the receiving elements. They are able to be experimentally determined in advance for the directional angles of interest and recorded in a reference antenna diagram. In this way, by evaluating the phase relations or by evaluating the amplitude relations, or also by combining both evaluation processes (evaluating the complex amplitudes), it is possible to determine the directional angle of a located radar object.

The high-frequency signals received in the various channel are able to be evaluated in a mixing process using a reference frequency, while maintaining the phase and amplitude relations, and converted into low-frequency signals which are able to be evaluated in an evaluation electronics. For example, the low-frequency signals can be digitized using analog/digital converters and then digitally further processed. A frequency spectrum is first recorded for each beam of the multibeam radar, i.e., for each of the low-frequency signals received from the various receiving elements. Each radar object emerges in the spectrum in the form of a peak, whose position is dependent upon the Doppler shift and, thus, upon the relative velocity of the object. When the transmitting frequency of the radar system is modulated, for example when working with a FMCW radar (frequency modulated continuous wave), the position of the peak is also dependent upon the propagation delay. When the transmitted signal is alternately modulated with ascending and descending ramps (ramp waves), the relative velocity of the object can be calculated from the frequency spacing of the peaks obtained at the various ramps, and the distance of the object can be calculated from the average value of the peak frequencies. Any ambiguities in the received signals that arise when simultaneously locating (finding the position of) a plurality of objects, are able to be overcome by varying the ramp slopes in the frequency modulation. Peak pairs which belong together can be identified by the correspondence of the relative velocities and object distances obtained at various ramp slopes.

Since the signals received from the same object in the plurality of receiving elements of the multibeam radar have identical Doppler shifts and also at least nearly identical signal propagation times, the peaks in all the channels are more or less at the same frequency.

In the known method, as a measuring frequency for the angular determination, that frequency is selected which corresponds to the apex of the peak.

However, real (tangible) radar objects, in particular large objects such as trucks, usually have a plurality of centers of reflection, whose radar echoes are superposed in the various receiving elements and interfere with one another. This can degrade the accuracy and reliability of the angular determination.

SUMMARY OF THE INVENTION

An object of the present invention is to provide a method for determining directional angles which is more reliable with respect to the interference effects that occur when working with real radar objects.

This objective is achieved by a method of the type mentioned at the outset, in which steps (b) and (c) are executed repeatedly, each time for different measuring frequencies, and in which the directional angles obtained for the various measuring frequencies are checked for consistency.

This approach is based on the observation that the interference effects occurring in the context of large radar objects are critically dependent on the frequency, and, therefore, have different effects at different measuring frequencies. Often, these interference effects are already eliminated by a slight change in the measuring frequency, so that, by evaluating a plurality of measuring frequencies, one obtains a more reliable or more accurate result, since "outliers" (an observation far from normality) caused by interference in the context of an unfavorably selected measuring frequency, are able to be detected and eliminated or at least mitigated, with respect to their effects, by averaging the results.

When the results obtained for various measuring frequencies are inconsistent to the point where a clear directional angle cannot be determined, one at least receives the information that a reliable determination of the directional angle is not possible at the particular moment, thereby lessening the danger of erroneous determinations being made with respect to the directional angle.

In step (c), to determine the directional angle at the particular measuring frequency, the complex amplitudes are evaluated which also contain phase information, or optionally only the absolute amounts of the amplitudes.

When, as in the case of an FMCW radar, the frequency of the transmitted signal is modulated with different ramps, one obtains a separate frequency spectrum for each ramp, and the method described above may then be carried out for each peak in each one of these spectra. For one single object, the directional angles ascertained on the basis of the various spectra should then conform. When a plurality of objects is located simultaneously, this holds, of course, only on the condition that the plurality of peaks in the various spectra were each assigned to the correct object. Therefore, a discrepancy in the directional angles may also be used for examining and, if indicated, for correcting the assignment between peaks and objects.

However, even given a proper object assignment, interference effects can result in more or less substantial deviations in the directional angles, which are obtained for the same measuring frequency, from the various spectra. For that reason, for the consistency check, it is not only the results obtained for the various measuring frequencies that are compared to one another, but the results obtained from various spectra, i.e., from various ramps of the frequency modulation, as well. When, at a given measuring frequency, the results obtained from the various spectra deviate from one another, then this indicates that the result for this special measuring frequency is falsified by interference effects. In determining the most plausible directional angle, the result obtained for this measuring result is then weighted less heavily or completely excluded from the evaluation. Conversely, the plausibility of an obtained directional angle is rated to be all the higher, the more frequently this directional angle is confirmed by the evaluation of other spectra. Altogether, therefore, the accuracy and reliability can be considerably enhanced in this way.

The greater the number of beams of the multibeam radar is, the greater the angular resolution and the measuring accuracy generally become. However, as the number of beams increases, the evaluation on the basis of the reference patterns also becomes more complex.

When the frequency spectra exist in the form of discrete spectra, one obtains amplitude values for discrete frequencies which are preferably evenly distributed (equally spaced apart) over the considered frequency range. As a measuring frequency, preferably that frequency which corresponds to the maximum of the peak, as well as one or more adjacent frequencies are selected in the discrete spectrum, when evaluating three measuring frequencies, thus, for example, the maximum frequency, and the next lower, as well as the next higher frequency. Accordingly, when evaluating five measuring frequencies, preferably the maximum frequency and the two directly adjacent, lower frequencies, as well as the two directly adjacent higher frequencies are evaluated.

BRIEF DESCRIPTION OF THE DRAWINGS

FIGS. 5(A)–(E) show diagrams, which are indicative of the deviation between the measured amplitudes and the reference pattern as a function of the directional angle, for five different measuring frequencies and, in each case, for four frequency ramps.

DETAILED DESCRIPTION

Figure 1:
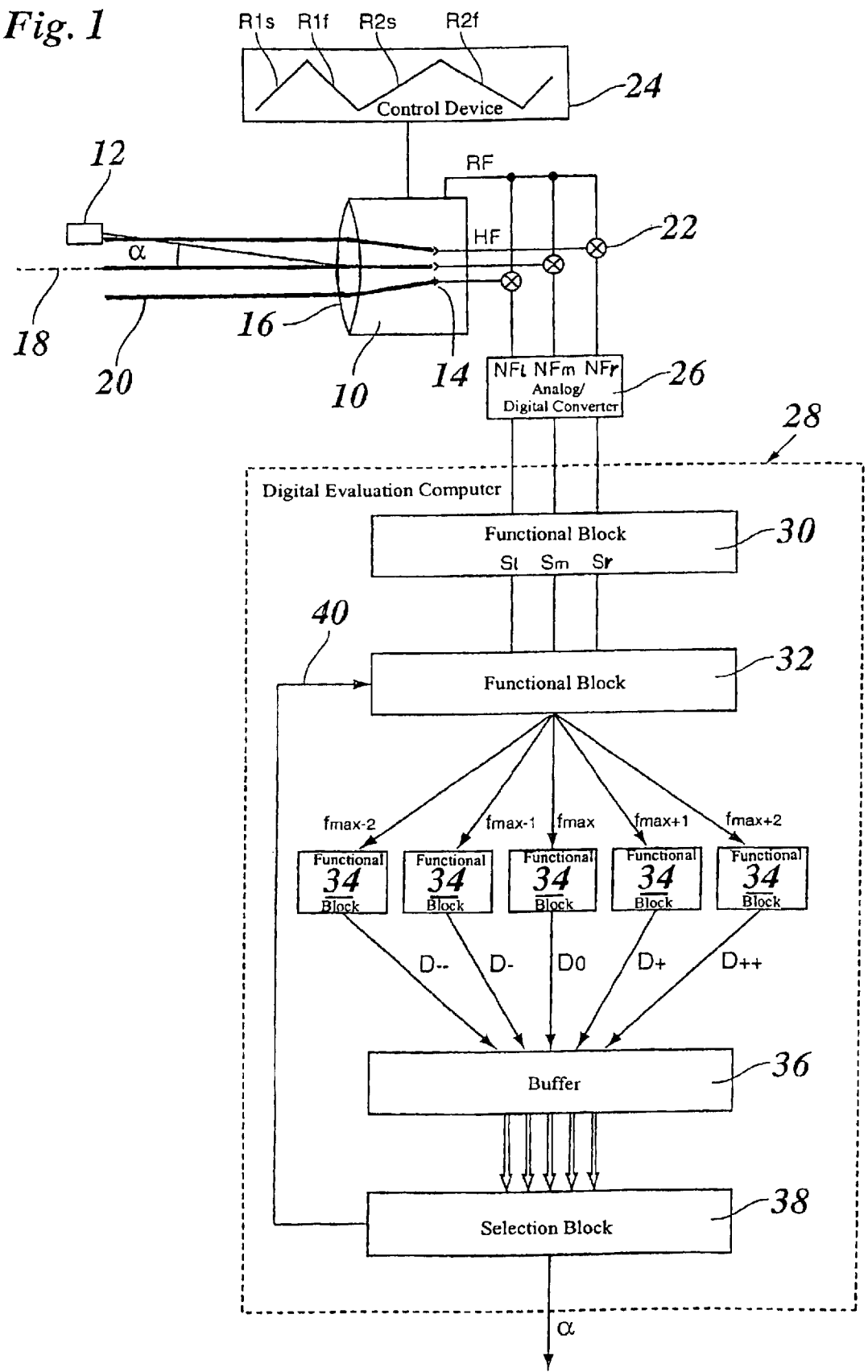
FIG. 1 shows a block diagram of a radar system for implementing the method according to the present invention.

FIG. 1 schematically depicts a radar sensor of a multibeam radar 10, which is installed on the front-end section of a motor vehicle and is used for finding the position of radar objects 12 located ahead of the vehicle. Multibeam radar 10, has three transmitting and receiving elements 14, referred to in the following, in short, as receiving elements, of which one is situated on optical axis 18 defined by an optical system 16 of the radar sensor, while the two others are configured so as to be laterally offset from the optical axis. In this manner, three measuring beams 20 are produced, which are emitted at different angles with respect to the optical axis. In practice, measuring beams 20 shown in the drawing only as lines, have the form of radar lobes which extend over relatively large, overlapping angular ranges. The lines in FIG. 1 indicate the direction of each intensity maximum of these radar lobes.

Radar object 12 is generally hit by all three radar lobes, and, for each measuring beam, produces a radar echo, which is focused again through optical system 16 at receiving element 14, which had emitted the measuring beam in question. The lines representing measuring beams 20 at the same time indicate the direction of the sensitivity maxima of receiving elements 14. Thus, each of the three receiving elements 14 receives a radar echo of greater or lesser intensity from radar object 12. The relation among the phases of the received signals, as well as the relation among their amplitudes are dependent upon directional angle a, at which radar object 12 is "seen" by multibeam radar 10.

High-frequency signals HF received by receiving elements 14 are mixed in each instance in a separate mixer 22 with a reference signal RF, whose frequency is on the same order as that of the received signal. Reference signal RF may be, for example, the signal which is fed to transmitting and receiving elements 14 in order for measuring beams 20 to be generated. The frequency of reference signal RF is then identical to the frequency of the transmitted radar waves. Thus, at the output of each mixer 22, one obtains a low-frequency signal NFr, NFm or NF1, whose frequency corresponds to the difference between the frequencies of the transmitted and the received signals. A control device 24, which determines the frequency of the transmitted signal (and thus also reference frequency RF), belongs to multibeam radar 10. In the illustrated example, multibeam radar 10 is an FMCW radar. The transmitted frequency is modulated with four different ramps, namely two ascending ramps R1$s$ and R2$s$ and two descending ramps R1$f$ and R2$f$. The slopes of ramps R1$s$ and R1$f$ are inversely equal, as are the slopes of ramps R2$s$ and R2$f$.

On the one hand, due to the frequency modulation, the frequencies of the low-frequency signals at the output of mixers 22 are dependent on the propagation delay of the radar waves to the radar object and back to receiving elements 14 and, on the other hand, due to the Doppler effect, they are dependent on the relative velocity of radar object 12. When, from the frequencies of the low-frequency signals, which are received during ramps R1s and R1f, one generates the average value, then the frequency shifts caused by the differences in the propagation delay cancel each other out, and one obtains a measure of the relative velocity. Conversely, if one forms the difference between these frequencies, then the frequency shifts caused by the Doppler effect cancel each other out, and one obtains a measure for the propagation delay and, thus, for the distance of radar object 12. Ramps R2s and R2f are used to eliminate ambiguities when simultaneously locating a plurality of radar objects.

Low-frequency signals NFr, NFm and NF1 are digitized in an analog/digital converter 26 and then fed via three parallel channels, which correspond to the three measuring beams 20, to a digital evaluation computer 28.

In a first functional block 30 of the evaluation computer, a discrete frequency spectrum Sr, Sm or S1 is calculated from the low-frequency signal for each channel. The measuring time for recording the frequency spectrum corresponds in each instance to the duration of ramp R1s, R1f, R2s or R2f, which is precisely the ramp used to modulate the transmitted frequency. For that reason, the propagation delay- and velocity-dependent frequency shifts are substantially constant during recording of the spectrum. Theoretically, therefore, for each radar object 12, one obtains exactly one peak in each frequency spectrum. When the signals on the three channels originate from the same radar object 12, the propagation delays and also the Doppler shifts are substantially the same in all three channels, so that the peaks in the three spectra roughly lie at the same frequency. However, their amplitudes are different, because the three receiving elements 14 receive radar echoes of different intensity from radar object 12. Since in the example shown in FIG. 1, radar object 12 is situated to the right of optical axis 18, the amplitude of low-frequency signal NFr will be the greatest, and the amplitude of signal NF1 the smallest. The same applies to the height of the peaks in the spectra. In a further functional block 32, a measuring frequency fmax is then sought, at which the three peaks assume their maximum in spectra Sr, Sm and S1. This frequency should be the same for all three spectra. In the case that slight deviations still exist, the most suitable frequency is selected as a measuring frequency. When a plurality of radar objects 12 are simultaneously located, the spectra contain a plurality of peaks, and, for each peak, the corresponding measuring frequency $f_{max}$ is determined.

The amplitudes of the three low-frequency signals at measuring frequency $f_{max}$ are then evaluated in a functional block 34, in order to determine possible candidates for directional angle a. For this purpose, using so-called amplitude matching, the pattern of the amplitudes received on the three channels at measuring frequency $f_{max}$ is compared angle for angle with a stored reference pattern, as is elucidated further below. The result is a deviation function $D_o$ which, for each angle, indicates the extent of the deviation between the measured amplitude patterns and the reference pattern. The angle or angles at which deviation function $D_o$ is at its minimum is/are, therefore, suitable candidate(s) for directional angle α.

In the illustrated example, this procedure is not only carried out for measuring frequency $f_{max}$, but also for four other measuring frequencies $f_{max-1}$ $f_{max-2}$ $f_{max+1}$ and $f_{max+2}$ which are directly adjacent to the apex of the peak in the discrete frequency spectra. For that reason, functional block 34 is shown fivefold in FIG. 1. The altogether five deviation functions $D_o$, $D_-$, $D_{--}$ $D_+$ and $D_{++}$, which one obtains in this way, are temporarily stored in a buffer 36.

Thus, for each radar object 12, one obtains at least five candidates for directional angle α. In the ideal case, for all five measuring frequencies, the same candidate, namely the correct directional angle, should result. However, if the amplitude has been falsified at one or more of the measuring frequencies by interference or other interference effects, different values may result for directional angle α. In such a! case, by averaging the results or by eliminating outliers, the accuracy and reliability may be enhanced when determining the directional angle.

The above described procedure is repeated during each ramp R1s, R1f, R2s and R2f, so that for one complete measuring cycle including all four ramps, one finally obtains four sets of deviation functions $D_{--}$, $D_-$, $D_o$, $D_+$ and $D_{++}$ in buffer 36. These four times five deviation functions are compared to one another in a selection block 38, in order to select the most plausible and thus most probable value for directional angle a and to output it as a result.

Since the position of the peaks in the frequency spectra is dependent on the ramp slope, during each ramp, one obtains different values for measuring frequencies $f_{max}$, $f_{max+1}$, etc., in functional block 32. When a plurality of radar objects 12 is simultaneously located, the corresponding peaks, obtained for the various ramps are properly allocated in the manner that is customary for a FMCW radar. In selection block 38, only those deviation functions are then compared to one another which belong to the same object. Since, typically, different objects are seen at different directional angles, on the other hand, the intermediate results that one receives in selection block 38 as candidates for the directional angle may be used for verifying and, if indicated, for correcting the object assignment in functional block 32. This is indicated in FIG. 1 by a feedback arrow 40.

The principle of operation of the above described radar system shall now be explained on the basis of an example and with reference to FIGS. 2 through 5E.

Figure 2:
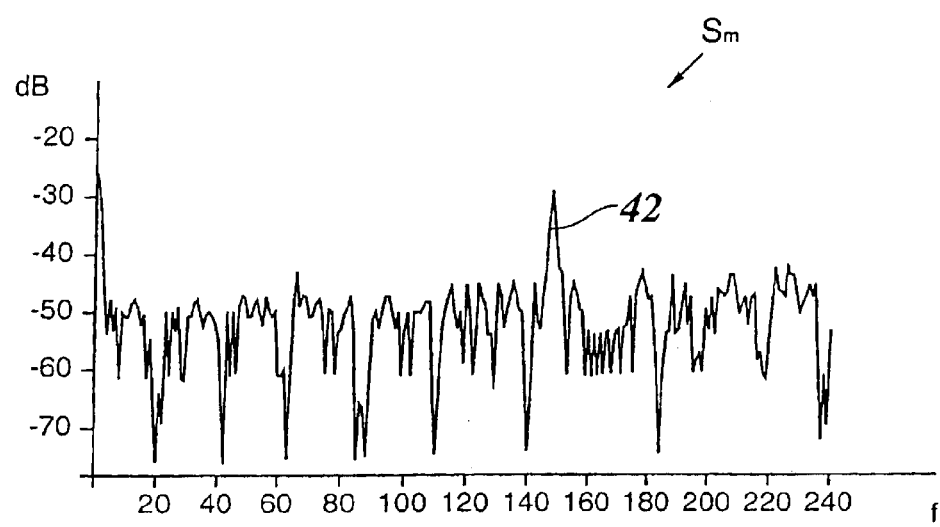
FIG. 2 shows an example of a frequency spectrum having a peak produced by a single radar object.

FIG. 1 shows an example of one of the frequency spectra, for example $S_m$, calculated in functional block 30. The discrete frequencies in the spectrum are numbered by a consecutive index f, which is indicated in FIG. 2 on the horizontal axis. Radar object 12 emerges (stands out) in the spectrum in the form of a single peak 42, whose apex is at frequency index f=148.

Figure 3:
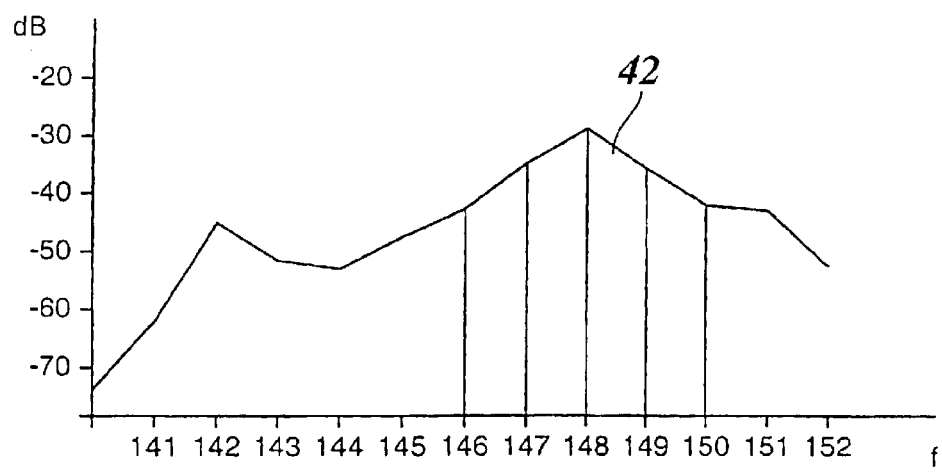
FIG. 3 shows the peak of the spectrum according to FIG. 2 having a higher frequency resolution.

In FIG. 3, peak 42 is shown with a higher frequency resolution. In functional block 32 in FIG. 2, the following measuring frequencies (expressed as frequency indices) are selected for this peak: $f_{max}$=148, $f_{max-1}$=147, $f_{max-2}$=146, $f_{max+1}$=149 and $f_{max+2}$=150.

Figure 4:
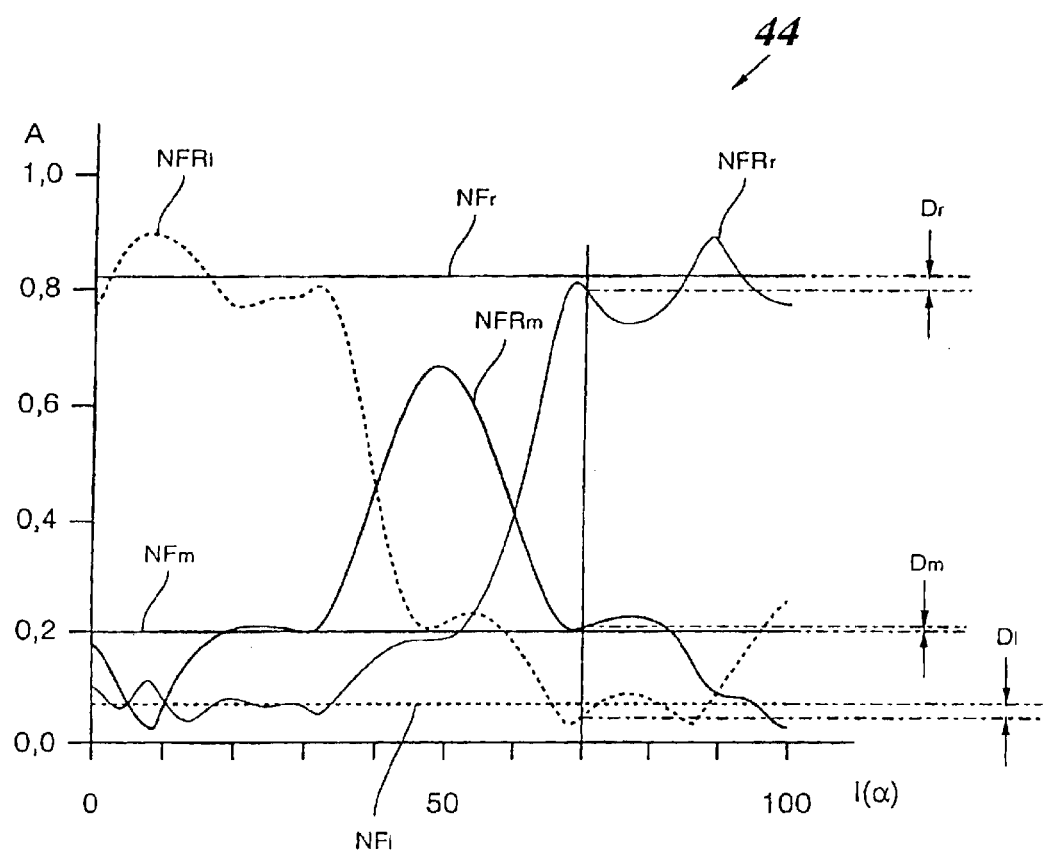
FIG. 4 shows an example of a reference antenna diagram which indicates the relation among the amplitudes as a function of the directional angle.

FIG. 4 shows a so-called reference antenna diagram 44 which is stored in evaluation computer 28 and is consulted for the evaluation in functional blocks 34 in FIG. 1. For each directional angle within the considered angular range, this reference antenna diagram 44 specifies a reference pattern which indicates which relation would theoretically have to exist among the amplitudes of the three low-frequency signals NFr, NFm und NF1, given an ideal radar object. The directional angles are indicated in FIG. 4 on the horizontal axis in the form of an angular index I(α) which, in the illustrated example, runs from 0 to 100. The allocation to directional angles α is dependent on the size of the radar system's angular sensing range. In the illustrated example, index 50 corresponds to directional angle α =0. At an angular sensing range of ±10°, index 100 would then correspond to a directional angle of α=+10° (deviation to the right), and index 0 to a directional angle of α=−10°.

Since the amplitudes of the received radar echoes differ from object to object, the measured amplitudes, as well as the amplitudes in the reference antenna diagram must be normalized to enable them to be compared to one another. In the illustrated example, amplitudes A in the reference antenna diagram are also normalized in accordance with the sum standard, so that the sum of all three amplitudes always yields value 1. The theoretical amplitude NFRm for low-frequency signal NFm in the middle channel is represented in FIG. 4 by a solid, bold curve. It is roughly symmetrical to index 50 (a=0) and is also at its maximum at this index. The theoretical amplitude NFR1 for low-frequency signal NF1 is represented in FIG. 4 by a dotted-line curve, which is at its maximum at smaller index values, while the theoretical amplitude NFRr for low-frequency signal NFr is represented by a thinner continuous curve, which is at its maximum at index values of more than 50.

The three horizontal straight lines drawn in a corresponding line representation in FIG. 4 indicate the corresponding measured amplitudes of low-frequency signals NFm, NFr and NF1. The object of the algorithm, which is executed in functional block 34 in FIG. 1, in principle, is to search the angular index in which the measured amplitudes best match the theoretical amplitudes. In the illustrated example, this is the case for angular index I(α)=70. For each channel, the corresponding deviations Dm, Dl and Dr between the theoretical and the measured amplitudes are indicated in FIG. 4. These deviations are able to be analogously determined for each angular index. From deviations Dm, Dr and Dl in the individual channels, deviation function $D_o$, i.e., $D_+$, $D_{++}$, $D_-$ or $D_{--}$ is calculated. It indicates the total deviation, for example in the form of the square sum of deviations Dm, Dr and Dl.

Strictly speaking, the exact form of reference antenna diagram 44 is also dependent on the frequency of the transmitted and received radar waves. Since, however, the frequency of the received radar waves differs only little from the transmitted frequency, generally, it suffices to store one single reference antenna diagram 44, which is valid for all frequencies and, accordingly, may be used for evaluation purposes in all five functional blocks 34 in FIG. 1.

FIGS. 5(A) through (E) show the total of twenty deviation functions $D_{--}$, $D_-$, $D_o$, and $D_{++}$ which are obtained in this manner during one complete measuring cycle made up of four ramps and which are stored in buffer 36 and then compared to one another in selection block 38. Curves 46a and 48a in FIG. 5(A) indicate deviation functions $D_{--}$ that one had obtained at measuring frequency $f_{max-2}$ during ramps R1s and R1f. Curves 50a and 52a indicate the deviation functions for ramps R2s and R2f and for the same measuring frequency. The corresponding curves in FIGS. 5(B)–(E) are characterized with the same reference numerals and each with a different letter supplement (b–e).

If one were to undertake the evaluation only at the single measuring frequency $f_{max}$, then one would only have the result in accordance with FIG. 5(C). Here, curves 46c and 48c have their minimum at an angular index of about 72, while curves 50c and 52c have their minimum at an angular index of about 83. For that reason, it is not possible to clearly decide which directional angle α is now the correct one.

However, if one includes in the consideration those results which were obtained at measuring frequencies $f_{max-1}$ and $f_{max-1}$, then it is very probable that an angular index of about 70 is the correct one. At $f_{max-1}$ (FIG. 5(B)), one does, in fact, obtain similarly contradictory results as in FIG. 5(C), however curves 46d and 48d in FIG. 5(D) merely confirm an angular index near 70, while the minimum of the two other curves 50d and 52/d is at a completely different value here (namely at 20). Therefore, the final angular index could be determined in selection block 38, for instance, by eliminating curves 50b–50d and 52b–50d; which yield inconsistent results, and by generating the average value from the minima of the remaining curves (near 70).

If one additionally considers the results that were obtained for the one-after-the-next adjacent frequencies $f_{max-2}$ and $f_{max+2}$ (FIGS. 5(A) and 5(E)), then one discerns that FIG. 5(A), in fact, does not yield a consistent result and is, therefore, unusable; FIG. 5(E), on the other hand, shows virtually the same curve shape for all four ramps, having a minimum at an angular index of about 68. From this, one may conclude, in this case, that the amplitudes are falsified at frequency $f_{max+2}$ at least by interference or interference effects and, therefore, yield the most reliable result. Therefore, in this case, the algorithm in selection block 38 would yield angular index α which belongs to angular index 68.

Different implementations are possible for the selection algorithm. In the simplest case, the average value is simply generated from the minima of the altogether twenty curves. A refinement may provide for eliminating obvious "outliers" before the averaging operation.

In accordance with another specific embodiment, the algorithm may be so conceived that, for each individual measuring frequency, one or more candidates are initially determined for the angular index, as well as for the corresponding weightings. In this context, the weighting of an angular index is all the greater, the smaller the deviation function is and the better the various curves conform at this angular index. For example, in FIG. 5(C), angular indices 72 and 83 would receive an average weighting, since, here, two of the altogether four curves coincide at their minimum. On the other hand, in FIG. 5(E), angular index 68 would receive a more than twice as high weighting, because here the same value is confirmed by all four curves. In the last selection step, that angular index would then be selected at which the weighted sum of the angular indices defined for the individual measuring frequencies, is at its maximum.

Conversely, it is also possible to initially determine one or more candidates for the angular index and corresponding weightings on the basis of curves 46a–46e, then correspondingly for curves 48a–48e, etc., and then, finally, to select the angular index for which the weighted sum of the thus obtained angular indices is at its maximum.

Instead of calculating the selection functions in functional blocks 34, it is also possible, in these functional blocks, to directly calculate individual candidates for the angular indices, as well as corresponding weightings or plausibilities and, then, in selection block 38, to make a selection among these candidates.

What is claimed is:

1. A method for determining a directional angle of a radar object using a multibeam radar, the method comprising:
    (a) recording a frequency spectra of radar echoes for a plurality of beams;
    (b) seeking a measuring frequency near a frequency maximum assigned to a radar; and
    (c) comparing at least one of phases and amplitudes of the radar echoes at the measuring frequency with reference patterns known for various directional angles,
    wherein steps (b) and (c) are executed repeatedly, each time for different measuring frequencies, and wherein the directional angles obtained for the measuring frequencies are checked for consistency.

2. The method according to claim 1, wherein in step (c), the amplitudes of the radar echoes are compared with reference patterns given by a reference antenna diagram.

3. The method according to claim 1, further comprising modulating a transmitting frequency of the multibeam radar with different ramps, and wherein steps (a), (b) and (c) are executed separately for each ramp, and in the consistency check, directional angles obtained for the ramps at one of the same and different measuring frequencies are also checked for consistency.

4. The method according to claim 1, wherein, in step (c), plausibility variables are calculated for a plurality of possible directional angles, a plausibility variable for a given directional angle being the greater the better the directional angle conforms with a reference pattern, and, as a final directional angle, a particular directional angle is selected which, in view of the plausibility variables obtained for the measuring frequencies, has a greatest plausibility.

5. A radar system comprising:

a multibeam radar; and an evaluation device for determining a directional angle of a radar object, the evaluation device including:

a first device for recording frequency spectra of radar echoes, a second device for seeking a plurality of measuring frequencies near a frequency maximum assigned to the radar object in the frequency spectra, a third device for comparing at least one of phases and amplitudes of the radar echoes at each of the measuring frequencies with reference patterns one of stored and calculated for various directional angles, and a fourth device for calculating a final directional angle for comparison results obtained for various measuring frequencies.

* * * * *

UNITED STATES PATENT AND TRADEMARK OFFICE
CERTIFICATE OF CORRECTION

PATENT NO. : 6,856,280 B1
DATED : February 15, 2005
INVENTOR(S) : Sonja Eder et al.

It is certified that error appears in the above-identified patent and that said Letters Patent is hereby corrected as shown below:

Column 2,
Lines 3-4, change "the various channel" to -- the various channels --

Column 5,
Line 41, change "spectra. In a further …" to -- spectra.
　　　　　　　　　　　　　　　　　　　　　　In a further… --

Column 7,
Line 66, change "$f_{max-1}$, then it is" to -- $f_{max+1}$, then it is --

Signed and Sealed this

Fourteenth Day of June, 2005

JON W. DUDAS
*Director of the United States Patent and Trademark Office*